(12) United States Patent
Chatterji et al.

(10) Patent No.: US 7,174,961 B2
(45) Date of Patent: *Feb. 13, 2007

(54) METHODS OF CEMENTING USING CEMENT COMPOSITIONS COMPRISING BASALT FIBERS

(75) Inventors: Jiten Chatterji, Duncan, OK (US); Roger S. Cromwell, Walters, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/089,609

(22) Filed: Mar. 25, 2005

(65) Prior Publication Data

US 2006/0213664 A1 Sep. 28, 2006

(51) Int. Cl.
*E21B 33/138* (2006.01)
*E21B 33/14* (2006.01)

(52) U.S. Cl. .............. 166/292; 166/309; 106/672; 106/816; 106/819

(58) Field of Classification Search ........ 166/292, 166/293, 309; 106/672, 711, 816, 819; 405/266
See application file for complete search history.

(56) References Cited

U.S. PATENT DOCUMENTS

| | | | |
|---|---|---|---|
| 2,463,561 A | 3/1949 | Riley | 106/99 |
| 3,092,505 A | 6/1963 | Demaison | 106/99 |
| 3,363,689 A | 1/1968 | Smith et al. | 166/29 |
| 3,834,916 A | 9/1974 | Kesler | 106/99 |
| 3,953,953 A | 5/1976 | Marsden | 52/659 |
| 4,062,913 A | 12/1977 | Miller et al. | 264/24 |
| 4,126,003 A * | 11/1978 | Tomic | 405/259.6 |
| 4,126,005 A * | 11/1978 | Coursen | 405/259.6 |
| 4,126,009 A * | 11/1978 | Tomic | 405/259.5 |
| 4,140,533 A | 2/1979 | Ohtomo et al. | 106/50 |
| 4,199,336 A | 4/1980 | Rittler | 65/2 |
| 4,224,377 A | 9/1980 | Moens | 428/369 |
| 4,304,604 A * | 12/1981 | Daerr et al. | 501/38 |
| 4,341,835 A | 7/1982 | MacDowell | 428/292 |
| 4,366,255 A | 12/1982 | Lankard | 501/95 |
| 4,474,907 A | 10/1984 | Genba et al. | 523/206 |
| 4,565,840 A | 1/1986 | Kobayashi et al. | 524/8 |
| 4,585,487 A | 4/1986 | Destree et al. | 106/99 |
| 4,610,926 A | 9/1986 | Tezuka | 528/399 |
| 4,780,141 A | 10/1988 | Double et al. | 106/38.3 |
| 4,960,649 A | 10/1990 | Takata et al. | 428/574 |
| 4,968,561 A | 11/1990 | Mizobe et al. | 428/397 |
| 5,002,610 A * | 3/1991 | Sherif et al. | 106/691 |
| 5,118,225 A | 6/1992 | Koch et al. | 406/144 |
| 5,167,710 A * | 12/1992 | Leroux et al. | 106/711 |
| 5,421,409 A | 6/1995 | Mueller et al. | 166/292 |
| 5,443,918 A | 8/1995 | Banthia et al. | 428/603 |
| 5,447,564 A | 9/1995 | Xie et al. | 106/644 |
| 5,456,752 A | 10/1995 | Hogan | 106/802 |
| 5,588,489 A | 12/1996 | Chatterji et al. | 166/293 |
| 5,628,822 A | 5/1997 | Hogan | 106/802 |
| 5,649,568 A | 7/1997 | Allen et al. | 138/137 |
| 5,711,801 A | 1/1998 | Chatterji et al. | 106/789 |
| 5,820,670 A | 10/1998 | Chatterji et al. | 106/727 |
| 5,865,000 A | 2/1999 | Nemegeer et al. | 52/309.1 |
| 5,875,845 A | 3/1999 | Chatterji et al. | 166/293 |
| 5,897,699 A | 4/1999 | Chatterji et al. | 106/678 |
| 5,948,157 A | 9/1999 | McKenney et al. | 106/711 |
| 5,981,630 A | 11/1999 | Banthia et al. | 524/8 |
| 6,063,738 A | 5/2000 | Chatterji et al. | 507/269 |
| 6,220,354 B1 | 4/2001 | Chatterji et al. | 166/293 |
| 6,230,804 B1 | 5/2001 | Mueller et al. | 166/293 |
| 6,308,777 B2 | 10/2001 | Chatterji et al. | 166/293 |
| 6,367,550 B1 | 4/2002 | Chatterji et al. | 166/293 |
| 6,457,524 B1 | 10/2002 | Roddy | 166/293 |
| 6,458,198 B1 | 10/2002 | Baret et al. | 106/644 |
| 6,500,252 B1 | 12/2002 | Chatterji et al. | 106/644 |
| 6,508,305 B1 | 1/2003 | Brannon et al. | 166/293 |
| 6,547,871 B2 | 4/2003 | Chatterji et al. | 106/672 |
| 6,550,362 B1 | 4/2003 | Galinat et al. | 83/23 |
| 6,582,511 B1 | 6/2003 | Velpari | 106/711 |
| 6,613,424 B1 | 9/2003 | Putt et al. | 428/312.4 |

(Continued)

FOREIGN PATENT DOCUMENTS

WO   WO 03/014040   2/2003

(Continued)

OTHER PUBLICATIONS

Paper entitled "Steel and Synthetic Fiber Blends" by Bob Zellers et al., NYCON, printed from the internet on Jul. 16, 2004.

(Continued)

*Primary Examiner*—George Suchfield
(74) *Attorney, Agent, or Firm*—Craig W. Roddy; Fletcher Yoder

(57) ABSTRACT

Methods of using cement compositions that comprise basalt fibers in subterranean formations are provided. An example of such a method may comprise providing a cement composition that comprises water, a hydraulic cement, and a plurality of basalt fibers; introducing the cement composition into a subterranean formation; allowing the cement composition to set therein. Also provided are methods of cementing a pipe string in a well bore and methods of enhancing the compressive strength of a cement composition.

27 Claims, No Drawings

U.S. PATENT DOCUMENTS

| | | | |
|---|---|---|---|
| 6,645,288 B1 | 11/2003 | Dargaud et al. | 106/696 |
| 6,647,747 B1 | 11/2003 | Brik | 65/492 |
| 6,689,208 B1 | 2/2004 | Brothers | 106/794 |
| 6,702,044 B2 | 3/2004 | Reddy et al. | 175/64 |
| 6,729,405 B2 | 5/2004 | DiLullo et al. | 166/292 |
| 6,823,940 B2 | 11/2004 | Reddy et al. | 166/295 |
| 6,824,847 B2 | 11/2004 | Mariaggi et al. | 428/36.9 |
| 6,832,651 B2 | 12/2004 | Ravi et al. | 166/292 |
| 6,837,316 B2 | 1/2005 | Reddy et al. | 175/64 |
| 6,848,519 B2 | 2/2005 | Reddy et al. | 175/64 |
| 6,861,392 B2 | 3/2005 | Shaarpour | 507/104 |
| 6,866,712 B1 | 3/2005 | Rossi et al. | 106/489 |
| 2004/0045713 A1 | 3/2004 | Bianchi et al. | 166/293 |
| 2004/0106704 A1 | 6/2004 | Meyer et al. | 524/2 |
| 2006/0000611 A1* | 1/2006 | Reddy et al. | 166/293 |
| 2006/0000612 A1* | 1/2006 | Reddy et al. | 166/293 |
| 2006/0157244 A1 | 7/2006 | Reddy et al. | |

FOREIGN PATENT DOCUMENTS

| | | |
|---|---|---|
| WO | WO 2004/022500 A2 | 3/2004 |
| WO | WO 2004/022500 A3 | 3/2004 |
| WO | WO 2004/101704 A1 | 11/2004 |

OTHER PUBLICATIONS

Saint-Gobain technical data sheet entitled "Cem-Fil* Chopped Strands 70/30" dated 2000.
Saint-Gobain technical data sheet entitled "Cem-Fil* Chopped Strands 60/38" dated 2000.
Saint-Gobain technical data sheet entitled "Cem-Fil* Chopped Strands 62/2" dated 2000.
Saint-Gobain technical data sheet entitled Cem-Fil* Chopped Strands 60/2 dated 2000.
Saint-Gobain technical data sheet entitled "Cem-Mesh™ 120/1" dated 2001.
Saint-Gobain technical data sheet entitled "ANTI-CRAK™ High Dispersion Cem-Fil* AR-Chopped Strands" dated 2001.
Saint-Gobain technical data sheet entitled "ANTI-CRAK™ High Performance Cem-Fil* AR-Chopped Strands" dated 2001.
SI Corporation product bulletin entitled "Novomesh™ e3™" dated 2001.
SI Corporation brochure entitled "Xorex® Steel Fiber" dated 2002.
SI Corporation brochure entitled "Novotex™ Steel Fiber" dated 2002.
Nycon brochure entitled "NYCONSF" dated 2004.
Nycon brochure entitled "NYCONB" dated 2004.
INFORCE brochure entitled "Virgin Polypropylene Fibrillated Fibers Plastic Shrinkage & Plastic Settlement Crack Control" dated 2001.
SI Corporation paper entitled "VERTIFORCE™ with e3™ technology".
SI Corporation paper entitled "STEALTH® Virgin Polypropylene Fibers Plastic Shrinkage & Plastic Settlement" dated 2001.
SI Corporation paper entitled "e3 Engineered.Efficient.Effective. Concrete Reinforcement" dated 2001.
Beton paper entitled "Fiber Concrete—The perspectives for the future of an innovative construction material" printed from the internet on Jul. 16, 2004.
NYCON paper entitled "AR Glass Fibers" printed from the internet on Jul. 16, 2004.
Halliburton brochure entitled "Tuf Additive No. 2 Lost-Circulation Additive" dated 1999.
Patent Application entitled "Cement Compositions Comprising High Aspect Ration Materials and Method of Use in Subterranean Formations" by B. Raghava Reddy et al. filed Jul. 2, 2004 as U.S. Appl. No. 10/884,756.

* cited by examiner

METHODS OF CEMENTING USING CEMENT COMPOSITIONS COMPRISING BASALT FIBERS

BACKGROUND

The present invention relates to subterranean well cementing operations and, more particularly, to methods of cementing using cement compositions comprising basalt fibers.

Hydraulic cement compositions commonly are utilized in subterranean operations, particularly subterranean well completion and remedial operations. For example, hydraulic cement compositions are used in primary cementing operations whereby pipe strings, such as casing and liners, are cemented in well bores. In performing primary cementing, a hydraulic cement composition may be pumped into an annulus between the walls of a well bore and the exterior surface of the pipe string disposed therein. The cement composition sets in the annular space, thereby forming therein an annular sheath of hardened, substantially impermeable cement that supports and positions the pipe string in the well bore and bonds the exterior surface of the pipe string to the walls of the well bore. Hydraulic cement compositions also may be used in remedial cementing operations, such as plugging well bores, plugging highly permeable zones or fractures in well bores, plugging cracks and holes in pipe strings, and the like.

Once set, the cement sheath may be subjected to a variety of shear, tensile, impact, flexural, and compressive stresses that may lead to failure of the cement sheath, resulting, inter alia, in fractures, cracks, and/or debonding of the cement sheath from the pipe string and/or the formation. This may lead to undesirable consequences such as lost production, environmental pollution, hazardous rig operations resulting from unexpected fluid flow from the formation caused by the loss of zonal isolation, and/or hazardous production operations. Cement failures may be particularly problematic in high temperature wells, where fluids injected into the wells or produced from the wells by way of the well bore may cause the temperature of any fluids trapped within the annulus to increase. Furthermore, high fluid pressures and/or temperatures inside the pipe string may cause additional problems during testing, perforation, fluid injection, and/or fluid production. If the pressure and/or temperature inside the pipe string increases, the pipe may expand and stress the surrounding cement sheath. This may cause the cement sheath to crack, or the bond between the outside surface of the pipe string and the cement sheath to fail, thereby breaking the hydraulic seal between the two. Furthermore, high temperature differentials created during production or injection of high temperature fluids through the well bore may cause fluids trapped in the cement sheath to thermally expand, causing high pressures within the sheath itself. Additionally, failure of the cement sheath also may be caused by forces exerted by shifts in subterranean formations surrounding the well bore, cement erosion, and repeated impacts from the drill bit and the drill pipe.

To counteract these problems associated with the fracturing and/or cracking of the cement sheath, fibers may be included in the cement composition. Various types of fibers have been used heretofore, including those formed of polypropylene, polyester, polyamide, polyethylene, polyolefin, glass, iron, and steel. These fibers may function to control shrinkage cracking in the early stages of the cement setting process, and also may provide resiliency, ductility, and toughness to the set cement composition so that it resists cracking or fracturing. Further, if fracturing or cracking does occur, the fibers may function to hold the set cement composition together, thereby resisting fall back of the cement sheath. Additionally, fiber may act as lost circulation materials. However, as the cement composition sets, it releases hydrated lime, which may leach out or form alpha dicalcium silicate hydrate, resulting in increased permeability and porosity and decreased compressive strength. While synthetic fibers, such as polypropylene fibers, polyester fibers, and the like, may act to enhance the resiliency and ductility of the set cement composition, these synthetic fibers generally do not enhance compressive strength of the set cement composition or counteract the effects of the hydrated lime. Further, glass fibers may undesirably interact with the hydrated lime that is released during the setting of the cement composition; for example, the alkaline environment created by the hydrated lime may dissolve the glass fibers present in the cement composition.

SUMMARY

The present invention relates to subterranean well cementing operations and, more particularly, to methods of cementing using cement compositions comprising basalt fibers.

An embodiment of a method of the present invention provides a method of cementing. In an example of such a method, the method may comprise providing a cement composition that comprises water, a hydraulic cement, and a plurality of basalt fibers; introducing the cement composition into a subterranean formation; and allowing the cement composition to set therein.

Another embodiment of a method of the present invention provides a method of cementing a pipe string in a well bore. In an example of such a method, the method may comprise providing a cement composition that comprises water, a hydraulic cement, and a plurality of basalt fibers; introducing the cement composition into an annulus between at least one wall of the well bore and the pipe string disposed within the well bore; and allowing the cement composition to set therein.

Another embodiment of a method of the present invention provides a method of enhancing the compressive strength of a cement composition. In an example of such a method, the method may comprise adding a plurality of basalt fibers to the cement composition, wherein the cement composition comprises water and a hydraulic cement; introducing the cementing composition into a subterranean formation; and allowing the cement composition to set therein.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean well cementing operations and, more particularly, to methods of cementing using cement compositions comprising basalt fibers. While the compositions and methods are useful in a variety of well completion and remedial operations, they are particularly useful in primary cementing, e.g., cementing casings and liners in well bores, including those in multilateral subterranean wells.

The cement compositions of the present invention generally comprise water, a hydraulic cement, and a plurality of basalt fibers. Typically, the cement compositions of the present invention may have a density in the range of from about 4 pounds per gallon ("lb/gal") to about 20 lb/gal. In certain embodiments, the cement compositions may have a density in the range of from about 8 lb/gal to about 17 lb/gal. The cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

The water used in the cement compositions of the present invention may be freshwater, saltwater (e.g., water containing one or more salts dissolved therein), brine (e.g., saturated saltwater produced from subterranean formations), or seawater, or combinations thereof. Generally, the water may be from any source, provided that it does not contain an excess of compounds that adversely affect other components in the cement composition. The water may be present in an amount sufficient to form a pumpable slurry. More particularly, the water may be present in the cement compositions of the present invention in an amount in the range of from about 33% to about 200% by weight of the cement ("bwoc"). In some embodiments, the water may be present in an amount in the range of from about 35% to about 70% bwoc.

All cements suitable for use in subterranean cementing operations may be used in accordance with the present invention. Suitable examples include cements comprised of calcium, aluminum, silicon, oxygen, and/or sulfur, which set and harden by reaction with water. Such hydraulic cements, include, but are not limited to, Portland cements, pozzolana cements, gypsum cements, high alumina content cements, slag cements, and silica cements, and combinations thereof. In certain embodiments, the cement may comprise a Portland cement. In some embodiments, the Portland cements that are suited for use in the present invention are classified as Class A, C, H, and G cements according to American Petroleum Institute, *API Specification for Materials and Testing for Well Cements*, API Specification 10, Fifth Ed., Jul. 1, 1990.

The cement compositions of the present invention further comprise a plurality of basalt fibers. Among other things, the basalt fibers may aid in the prevention of lost circulation and also may act to provide resiliency and impact resistance to the set cement composition. Basalt fibers also may increase the compressive and tensile strengths of the set cement compositions. For instance, the basalt fibers may react with the hydrated lime that is released during the setting of the cement composition.

Basalt fibers generally are produced from basalt, which is an igneous rock that is generally comprised of microscopic grains, such as calcium-sodium (plagioclase) feldspar, pyroxene, and olivine. Any suitable method for the production of inorganic fibers may be used for the production of the basalt fibers included in the cement compositions of the present invention. In some embodiments, basalt fibers may be produced by a process of extrusion through fine holes, which determines the diameter of the fibers. In some embodiments, basalt fibers may be produced by melt spinning. Suitable basalt fibers are commercially available from Forta Corporation, Grove City, Pa. Basalt fibers having a variety of lengths and diameters may be suitable for use with the present invention. The diameter and length of the basalt fibers may be controlled during preparation thereof. In some embodiments, the basalt fibers may have a diameter in the range of from about 9 microns to about 13 microns. In some embodiments, the basalt fibers may a length in the range of from about 3 millimeters ("mm") to about 9 mm. Suitable commercially available basalt fibers may have a length of about 6 mm. The appropriate length and diameter of the basalt fibers for a particular application may be selected based on, for example, commercial availability and dry blending requirements.

The basalt fibers should be present in the cement compositions of the present invention in an amount sufficient to provide the desired mechanical properties, including resiliency, compressive strength, and tensile strength. In some embodiments, the basalt fibers are present in the cement compositions of the present invention in an amount in the range of from about 0.1% to about 1.5% bwoc. In some embodiments, the basalt fibers are present in an amount in the range of from about 0.1% to about 0.3% bwoc. In some embodiments, the basalt fibers are present in an amount of 0.125% bwoc.

Further, the cement compositions of the present invention optionally may be foamed using a suitable gas (such as air or nitrogen, or a combination thereof) and a foaming agent. Among other things, the foaming agent may act to facilitate the formation and stabilization of a foamed cement composition. Suitable foaming agents, include, but are not limited to, anionic or amphoteric surfactants, or combinations thereof, such as, for example, a mixture of an ammonium salt of alcohol ether sulfate (HOWCO-SUDS™ foaming agent) and cocoylamidopropyl betaine (HC-2™ foaming agent) commercially available from Halliburton Energy Services, Inc., Duncan, Okla.; a 2:1 mixture of the sodium salt of alpha-olefin sulfonate (AQF-2™ foaming agent) and cocylamidopropyl betaine (HC-2™ foaming agent) commercially available from Halliburton Energy Services, Inc., Duncan, Okla.; and a mixture of an ethoxylated alcohol ether sulfate, an alkyl or alkyene amidopropyl betaine and an alkyl or alkene amidopropyldimethylamine oxide commercially available from Halliburton Energy Services, Inc. under the trade name ZONESEAL 2000™ foaming agent. Examples of suitable foaming agents are described in U.S. Pat. Nos. 6,210,476; 6,063,738; 5,897,699; 5,875,845; 5,820,670; 5,711,801; and 5,588,489; the relevant disclosures of which are incorporate herein by reference. The foaming agent generally may be present in an amount sufficient to provide the desired foaming of the cement composition. In some embodiments, the foaming agent may be present in the cement compositions of the present invention in an amount in the range of from about 0.8% to about 5% by volume of the water. In some embodiments, the foaming agent may be present in an amount in the range of from about 2% by volume of the water.

Other additives suitable for use in subterranean well bore cementing operations also may be added to these compositions. Other additives, include, but are not limited to, defoamers, dispersants, retardants, accelerants, fluid loss control additives, weighting agents, vitrified shale, lightweight additives (e.g., bentonite, gilsonite, glass spheres, etc.), and fly ash, and combinations thereof. A person having ordinary skill in the art, with the benefit of this disclosure, will know the type and amount of additive useful for a particular application and desired result.

To facilitate a better understanding of the present invention, the following examples of certain aspects of some embodiments are given. In no way should the following examples be read to limit, or define, the scope of the invention.

EXAMPLES

Example 1

A sample of basalt fibers was analyzed to determine the composition thereof. Elemental analysis using a MiniPal spectrometer, commercially available from Philips Analytical, showed the presence of Al, Si, K, Ca, Ti, Cr, Mn, Fe, Cu, Zn, Sr, and Zr. Table 1 shows the percentage of each these elements found using elemental analysis. The elemental analyses are shown in Table 1 as oxides.

TABLE 1

| | Compound | | | | | | | | | | | |
|---|---|---|---|---|---|---|---|---|---|---|---|---|
| | $Al_2O_3$ | $SiO_2$ | $K_2O$ | CaO | $TiO_2$ | $Cr_2O_3$ | MnO | $Fe_2O_3$ | CuO | ZnO | SrO | $ZrO_2$ |
| Concentration (%) | 21 | 47 | 2.0 | 11.2 | 1.6 | 0.061 | 0.30 | 17.2 | 0.063 | 0.02 | 0.063 | 0.054 |

An elemental analysis was also performed on the basalt fibers using x-ray fluorescence, the results of which are shown in Table 2.

TABLE 2

| Oxide | Concentration (%) |
|---|---|
| $Na_2O$ | 0.14 |
| MgO | 0.23 |

TABLE 2-continued

| Oxide | Concentration (%) |
|---|---|
| $Al_2O_3$ | 20.72 |
| $SiO_2$ | 58.92 |
| $SO_3$ | 0.144 |
| $K_2O$ | 1.66 |
| CaO | 8.03 |
| $TiO_2$ | 1.03 |
| MnO | 0.08 |
| $Fe_2O_3$ | 8.72 |
| SrO | 0.04 |
| BaO | 0.00 |
| Total | 100 |

Example 2

Sample compositions were prepared by combining Portland Class H cement with freshwater in an amount of 4.3 gallons per 94-pound sack of cement. The density of the resulting slurries was 16.4 pounds per gallon. In Sample Composition Nos. 2–7, 9, and 10, fibers were also included, wherein the amount and type of fiber included in each sample was varied. Further, Sample Composition Nos. 8–10 were foamed. To these samples, ZONESEAL™ 2000 foaming agent was added in an amount of 2% by volume of the freshwater, and the samples were then foamed with air to a density of 12.5 pounds per gallon. After preparation, the sample compositions were cured at 140° F. for 72 hours. Thereafter, standard mechanical tests were performed on the set sample compositions in accordance with API Recommended Practices 10B, Twenty-Second Edition, December 1997, to determine the compressive strength and the tensile strength. The Young's Modulus of Elasticity and the Poisson's Ratio were determined in accordance with AS™ D3148-02. The results of these tests are shown in Table 3.

TABLE 3

| Sample No. | Density (lb/gal) | Foamed Density (lb/gal) | Fiber Type | Fiber % (bwoc) | Compressive Strength (psi) | Tensile Strength (psi) | Young's Modulus (×10$^6$) | Poisson's Ratio |
|---|---|---|---|---|---|---|---|---|
| 1 | 16.4 | — | — | — | 4,120 | 467 | 1.91 | 0.193 |
| 2 | 16.4 | — | Polypropylene | 0.250 | 3,590 | 512 | 1.48 | 0.140 |
| 3 | 16.4 | — | Polypropylene | 0.125 | 3,610 | 504 | 1.67 | 0.138 |
| 4 | 16.4 | — | Hydrophilic Polypropylene | 0.250 | 3,750 | 493 | 1.45 | 0.124 |
| 5 | 16.4 | — | Hydrophilic Polypropylene | 0.125 | 3,970 | 556 | 1.50 | 0.130 |
| 6 | 16.4 | — | Basalt | 0.250 | 4,842 | 538 | 0.475 | 0.190 |
| 7 | 16.4 | — | Basalt | 0.125 | 6,150 | 381 | 0.212 | 0.195 |
| 8 | 16.4 | 12.5 | — | — | 1,899 | 151 | 0.977 | 0.177 |
| 9 | 16.4 | 12.5 | Basalt | 0.250 | 1,839 | 192 | 0.973 | 0.188 |
| 10 | 16.4 | 12.5 | Basalt | 0.123 | 1,854 | 222 | 1.04 | 0.179 |

Therefore, Example 2 indicates, among other things, that the use of cement compositions of the present invention, that comprise water, a hydraulic cement, and a plurality of basalt fibers, may provide enhanced physical and chemical properties to the resultant set cement composition.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of cementing, comprising:
    providing a cement composition that comprises water, a hydraulic cement, and a plurality of basalt fibers;
    introducing the cement composition into a subterranean formation; and
    allowing the cement composition to set therein.

2. The method of claim 1 wherein the water is selected from the group consisting of: freshwater; saltwater; a brine; seawater; and combinations thereof.

3. The method of claim 1 wherein the cement is selected from the group consisting of: a Portland cement; a pozzolana cement; a gypsum cement; a high alumina content cement; a slag cement; a silica cement; and combinations thereof.

4. The method of claim 1 wherein the plurality of basalt fibers have a diameter in the range of from about 9 microns to about 13 microns.

5. The method of claim 1 wherein the plurality of basalt fibers have a length in the range of from about 3 millimeters to about 6 millimeters.

6. The method of claim 1 wherein the basalt fibers are present in the cement composition in an amount in the range of from about 0.1% to about 1.5% by weight of the cement.

7. The method of claim 1 wherein the cement composition is foamed, and wherein the cement composition further comprises a gas and a foaming agent.

8. A method of cementing a pipe string in a well bore, comprising:
providing a cement composition that comprises water, a hydraulic cement, and a plurality of basalt fibers;
introducing the cement composition into an annulus between at least one wall of the well bore and the pipe string disposed within the well bore; and
allowing the cement composition to set therein.

9. The method of claim 8 wherein the water is selected from the group consisting of: freshwater; saltwater; a brine; seawater; and combinations thereof.

10. The method of claim 8 wherein the cement is selected from the group consisting of: a Portland cement; a pozzolana cement; a gypsum cement; a high alumina content cement; a slag cement; a silica cement; and combinations thereof.

11. The method of claim 8 wherein the plurality of basalt fibers have a diameter in the range of from about 9 microns to about 13 microns.

12. The method of claim 8 wherein the plurality of basalt fibers have a length in the range of from about 3 millimeters to about 6 millimeters.

13. The method of claim 8 wherein the basalt fibers are present in the cement composition in an amount in the range of from about 0.1% to about 1.5% by weight of the cement.

14. The method of claim 8 wherein the cement composition is foamed, and wherein the cement composition further comprises a gas and a foaming agent.

15. A method of enhancing the compressive strength of a cement composition, comprising:
adding a plurality of basalt fibers to the cement composition, wherein the cement composition comprises water and a hydraulic cement;
introducing the cementing composition into a subterranean formation; and
allowing the cement composition to set therein.

16. The method of claim 15 wherein the water is selected from the group consisting of: freshwater; saltwater; a brine; seawater; and combinations thereof.

17. The method of claim 15 wherein the plurality of basalt fibers have a diameter in the range of from about 9 microns to about 13 microns.

18. The method of claim 15 wherein the plurality of basalt fibers have a length in the range of from about 3 millimeters to about 6 millimeters.

19. The method of claim 15 wherein the basalt fibers are present in the cement composition in an amount in the range of from about 0.1% to about 1.5% by weight of the cement.

20. The method of claim 15 wherein the cement composition is foamed, and wherein the cement composition further comprises a gas and a foaming agent.

21. A method of cementing, comprising:
providing a cement composition that comprises water, a hydraulic cement, and a basalt fiber;
introducing the cement composition into a subterranean formation; and
allowing the cement composition to set therein.

22. The method of claim 21 wherein the water is selected from the group consisting of: freshwater; saltwater; a brine; seawater; and combinations thereof.

23. The method of claim 21 wherein the cement is selected from the group consisting of: a Portland cement; a pozzolana cement; a gypsum cement; a high alumina content cement; a slag cement; a silica cement; and combinations thereof.

24. The method of claim 21 wherein the basalt fiber has a diameter in the range of from about 9 microns to about 13 microns.

25. The method of claim 21 wherein the basalt fiber has a length in the range of from about 3 millimeters to about 6 millimeters.

26. The method of claim 21 wherein the basalt fiber is present in the cement composition in an amount in the range of from about 0.1% to about 1.5% by weight of the cement.

27. The method of claim 21 wherein the cement composition is foamed, and wherein the cement composition further comprises a gas and a foaming agent.

* * * * *